(12) United States Patent
Kawamura et al.

(10) Patent No.: US 11,040,643 B2
(45) Date of Patent: Jun. 22, 2021

(54) INSULATING SHEET, AND BACKREST SEAT AND COLD WEATHER GARMENT EMPLOYING THE SAME

(71) Applicant: Panasonic Intellectual Property Management Co., Ltd., Osaka (JP)

(72) Inventors: Norihiro Kawamura, Hokkaido (JP); Kazuhiko Kubo, Hokkaido (JP); Yuuichi Abe, Hokkaido (JP); Takeshi Fujii, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 153 days.

(21) Appl. No.: 15/577,021

(22) PCT Filed: Aug. 2, 2016

(86) PCT No.: PCT/JP2016/003556
§ 371 (c)(1),
(2) Date: Nov. 27, 2017

(87) PCT Pub. No.: WO2017/022241
PCT Pub. Date: Feb. 9, 2017

(65) Prior Publication Data
US 2018/0134194 A1    May 17, 2018

(30) Foreign Application Priority Data

Aug. 4, 2015  (JP) .............................. JP2015-153880
Dec. 22, 2015 (JP) .............................. JP2015-250146

(51) Int. Cl.
*B60N 2/58*   (2006.01)
*B32B 3/18*   (2006.01)
(Continued)

(52) U.S. Cl.
CPC .............. *B60N 2/5883* (2013.01); *B32B 3/04* (2013.01); *B32B 3/18* (2013.01); *B32B 3/266* (2013.01);
(Continued)

(58) Field of Classification Search
CPC ......... B60N 2/5883; B32B 3/18; B32B 3/266; B32B 5/022; B32B 27/08; B32B 2262/0284
See application file for complete search history.

(56) References Cited

U.S. PATENT DOCUMENTS 2,329,590 A * 9/1943 Charney ................ A41D 19/02
                                                         2/169
5,624,726 A * 4/1997 Sanocki .................. F16L 59/02
                                                         428/71

(Continued)

FOREIGN PATENT DOCUMENTS

CN      201428905 Y      3/2010
JP     2009-268718 A    11/2009
(Continued)

OTHER PUBLICATIONS

English Translation of Chinese Search Report dated Apr. 18, 2019 for the related Chinese Patent Application No. 201680036798.2.
(Continued)

*Primary Examiner* — Maria V Ewald
*Assistant Examiner* — Tong Guo
(74) *Attorney, Agent, or Firm* — McDermott Will & Emery LLP

(57) ABSTRACT

A heat insulating sheet includes, a first sheet, a first heat insulator disposed on a main surface of the first sheet and including a first xerogel, a second heat insulator disposed on the main surface of the first sheet apart from the first heat insulator and including a second xerogel, and a second sheet
(Continued)

disposed on the main surface of the first sheet to cover the first and second heat insulators. A first region of the heat insulating sheet provided between the first and second heat insulators viewing in a direction perpendicular to the main surface has an extensible rate larger than an extensible rate of each of the first and second heat insulators. The heat insulating property of this heat insulating sheet hardly degrades.

19 Claims, 8 Drawing Sheets

(51) Int. Cl.
    *B32B 7/05*         (2019.01)
    *B32B 3/04*         (2006.01)
    *B32B 5/28*         (2006.01)
    *B60N 2/56*        (2006.01)
    *B32B 3/26*         (2006.01)
    *B32B 5/02*         (2006.01)
    *B32B 27/08*       (2006.01)
    *B32B 27/12*       (2006.01)
    *B32B 27/32*       (2006.01)
    *B32B 27/36*       (2006.01)

(52) U.S. Cl.
    CPC .............. *B32B 5/022* (2013.01); *B32B 5/28* (2013.01); *B32B 7/05* (2019.01); *B32B 27/08* (2013.01); *B32B 27/12* (2013.01); *B32B 27/32* (2013.01); *B32B 27/36* (2013.01); *B60N 2/56* (2013.01); *B60N 2/5891* (2013.01); *B32B 2262/0284* (2013.01); *B32B 2264/102* (2013.01); *B32B 2266/128* (2016.11); *B32B 2307/304* (2013.01); *B32B 2437/00* (2013.01); *B32B 2601/00* (2013.01); *B32B 2605/003* (2013.01)

(56) References Cited

U.S. PATENT DOCUMENTS

| | | | | |
|---|---|---|---|---|
| 5,728,147 | A | * | 3/1998 | Thomas .................... A61F 7/00 5/655.9 |
| 2002/0096932 | A1 | * | 7/2002 | Fujita ...................... B60N 2/58 297/452.56 |
| 2003/0003284 | A1 | * | 1/2003 | Schwertfeger ............ B32B 5/22 428/292.1 |
| 2003/0111454 | A1 | * | 6/2003 | Ishiyama ............. B60N 2/5628 219/217 |
| 2007/0020412 | A1 | * | 1/2007 | Kumamoto ............. A61F 7/034 428/34.2 |
| 2008/0095970 | A1 | * | 4/2008 | Takashima ............ F16L 59/065 428/69 |
| 2008/0229704 | A1 | | 9/2008 | Augustyniak et al. |
| 2009/0140563 | A1 | * | 6/2009 | Placide .................. A47C 31/11 297/224 |
| 2014/0252263 | A1 | * | 9/2014 | Besselievre ........... C04B 28/005 252/62 |
| 2015/0329028 | A1 | * | 11/2015 | Ogino .................. B60N 2/5635 297/180.14 |

FOREIGN PATENT DOCUMENTS

| | | | |
|---|---|---|---|
| JP | 2010-525188 A | | 7/2010 |
| JP | 2011-136859 | | 7/2011 |
| JP | WO2014132652 | * | 9/2014 |
| WO | WO2014091705 | * | 6/2014 |

OTHER PUBLICATIONS

International Search Report of PCT application No. PCT/JP2016/003556 dated Nov. 8, 2016.

\* cited by examiner

INSULATING SHEET, AND BACKREST SEAT AND COLD WEATHER GARMENT EMPLOYING THE SAME

This application is a U.S. national stage application of the PCT international application No.PCT/JP2016/003556 filed on Aug. 2, 2016, which claims the benefit of foreign priority of Japanese patent application No. 2015-153880 filed on Aug. 4, 2015 and Japanese patent application No. 2015-250146 filed on Dec. 22, 2015, the contents all of which are incorporated herein by reference.

TECHNICAL FIELD

The present disclosure relates to a heat insulating sheet, and a backrest seat and a cold weather garment using the heat insulating sheet.

BACKGROUND ART

In automobiles used in cold environment, when a person is seated on a cold backrest seat, heat of the human body transmits to the seat so that the person may feel uncomfortable. Even when a heater of the automobile is turned on, it takes time to heat the backrest seat sufficiently, and the person continuously feels uncomfortable for a while.

In view of this, the backrest seat may include a heat insulator disposed near the surface of the backrest seat to reduce a heat loss of the human body.

However, to obtain a high heat insulating property of the heat insulator, the heat insulator needs to be thick. In addition, the heat insulator for the backrest seat needs to have a mechanical strength enough to prevent breakage of the sheet due to a force applied to the insulator.

PTL 1 discloses a heat insulator including a silica xerogel held by a fibrous mat.

CITATION LIST

Patent Literature

PTL 1: Japanese Patent Laid-Open Publication No. 2011-136859

SUMMARY

A heat insulating sheet includes a first sheet, a first heat insulator disposed on a main surface of the first sheet and including a first xerogel, a second heat insulator disposed on the main surface of the first sheet apart from the first heat insulator and including a second xerogel, and a second sheet disposed on the main surface of the first sheet to cover the first and second heat insulators. A first region of the heat insulating sheet provided between the first and second heat insulators viewing in a direction perpendicular to the main surface has an extensible rate larger than an extensible rate of each of the first and second heat insulators.

The heat insulating property of this heat insulating sheet hardly degrades.

DETAIL DESCRIPTION OF EXEMPLARY EMBODIMENTS

All the following exemplary embodiments show examples. Numerical values, shapes, materials, components, positions in arrangement of the components, and connection states, for example, used in the following exemplary embodiments are examples, and are not intended to limit the invention. Components of the following exemplary embodiments not recited in independent claims showing a generic concept will be described as optional components.

Exemplary Embodiment 1

Figure 1:
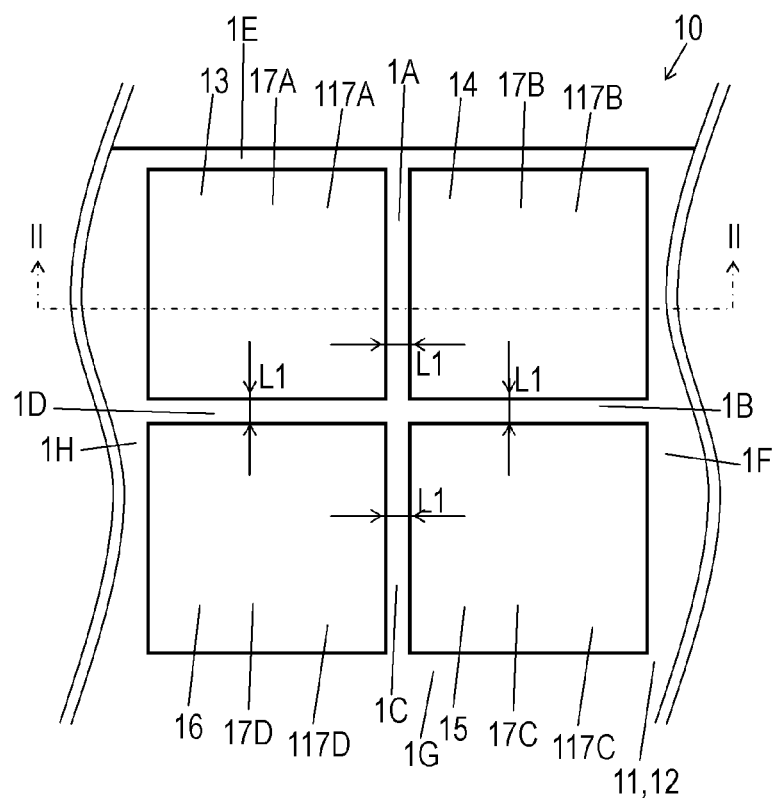
FIG. 1 is a top view of a heat insulating sheet according to Exemplary Embodiment 1.
Figure 2:
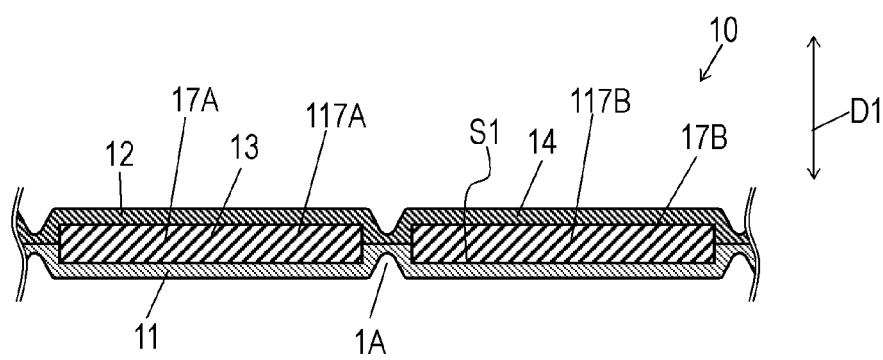
FIG. 2 is a cross-sectional view of the heat insulating sheet along line II-II shown in FIG. 1.

FIG. 1 is a top view of heat insulating sheet 10 according to Exemplary Embodiment 1. FIG. 2 is a cross-sectional view of heat insulating sheet 10 along line II-II illustrated in FIG. 1.

Heat insulating sheet 10 includes, sheet 11, heat insulator 13 disposed on main surface S1 of sheet 11 and including xerogel 117A, heat insulator 14 disposed on main surface S1 apart from heat insulator 13 and including xerogel 117B, heat insulator 15 disposed on main surface S1 apart from heat insulators 13 and 14, and heat insulator 16 disposed on main surface S1 apart from heat insulators 13, 14, and 15. Heat insulator 15 includes xerogel 117C. Heat insulator 16 includes xerogel 117D.

Heat insulating sheet 10 further includes sheet 12 disposed on main surface S1 of sheet 11 to cover heat insulator 13, heat insulator 14, heat insulator 15, and heat insulator 16.

Sheet 11 and sheet 12 are joined together in region 1A provided between heat insulators 13 and 14 viewing in direction D1 perpendicular to main surface S1. Sheet 11 and sheet 12 are joined together in region 1B provided between heat insulators 14 and 15 viewing in direction D1 perpendicular to main surface S1. Sheet 11 and sheet 12 are joined together in region 1C provided between heat insulators 15 and 16 viewing in direction D1 perpendicular to main surface S1. Sheet 11 and sheet 12 are joined together in region 1D provided between heat insulators 13 and 16 viewing in direction D1 perpendicular to main surface S1.

Heat insulator 13 includes fiber sheet 17A made of fibers holding xerogel 117A. Heat insulator 14 includes fiber sheet 17B made of fibers holding xerogel 117B. Heat insulator 15 includes fiber sheet 17C made of fibers holding xerogel 117C. Heat insulator 16 includes fiber sheet 17D made of fibers holding xerogel 117D. Xerogels 117A to 117D included in heat insulators 13 to 16 are made of nanosized particles having voids therein. Xerogels 117A to 117D restrict movement of air molecules in xerogels 117A to 117D, thereby having high heat insulating property. In accordance with Embodiment 1, xerogels 117A to 117D are made of silica xerogel. Fiber sheets 17A to 17D are used for maintaining the shapes of the xerogels in heat insulators 13 to 16. That is, heat insulating sheet 10 may not necessarily include fiber sheets 17A to 17D.

Fiber sheets 17A to 17D included in heat insulators 13 to 16 have thicknesses of 0.5 mm, and are made of nonwoven fabric made of thermoplastic resin, such as polyethylene terephthalate (PET).

Each of heat insulators 13 to 16 includes xerogel and thereby has high heat insulating property with a thermal conductivity ranging from about 0.018 to 0.024 W/m·K. Each of heat insulators 13 to 16 has a rectangular shape viewing in direction D1. Regarding the shape of each of heat insulators 13 to 16, a rectangular shape can be more easily formed than, e.g. a circular shape or an oval shape. In accordance with Embodiment 1, each of heat insulators 13 to 16 has a square shape having sides of about 70 mm In accordance with Embodiment 1, sheet 11 and sheet 12 have thicknesses of 0.1 mm in direction D1.

Sheet 11 and sheet 12 are joined together in regions 1A to 1D. Sheet 11 and sheet 12 are made of thermoplastic resin, such as low-density polyethylene. Since sheet 11 and sheet 12 have thermoplastic properties, sheet 11 and sheet 12 can be jointed together by heat sealing upon being heated. Sheet 11 and sheet 12 may be joined together by sewing with, for example, sutures. By sewing sheet 11 and sheet 12 together, mechanical strength of heat insulating sheet 10 can be enhanced. In a configuration in which sheet 11 and sheet 12 are sewed together in a single direction, heat insulating sheet 10 is less easily extensible in this direction than in the other directions. That is, heat insulating sheet 10 has anisotropy in extensibility. The shape of each of heat insulators 13 to 16 when seen in direction D1 is not limited to a specific shape. Sheets 11 and 12 may be joined together with an adhesive layer provided between the sheets.

In accordance with Embodiment 1, width L1 of region 1A that is a distance between heat insulators 13 and 14 is 3 mm. Width L1 of region 1B that is a distance between heat insulators 14 and 16 is 3 mm. Width L1 of region 1C that is a distance between heat insulators 15 and 16 is 3 mm. Width L1 of region 1D that is a distance between heat insulators 13 and 15 is 3 mm.

Each of regions 1A to 1D of heat insulating sheet 10 where sheet 11 and sheet 12 are joined together has an extensible rate larger than extensible rates of heat insulators 13 to 16. The extensible rate herein refers to a ratio of the length of an arbitrary cutout portion with a predetermined size after extending by pulling with a predetermined force with respect to the length of the arbitrary portion before the extension. The extensible rate of each of regions 1A to 1D is the extensible rate measured by pulling sheet 11 and sheet 12 that are joined together.

A heat insulating property of the heat insulator disclosed in PTL 1 may degrade because of separation of silica xerogel due to a force applied to the heat insulator.

In heat insulating sheet 10 according to Embodiment 1, the extensible rates of regions 1A to 1D described above causes portions of sheets 11 and 12 in regions 1A to 1D to extend prior to other regions, and reduces a force applied to heat insulators 13 to 16 even when the force is applied to heat insulating sheet 10. Thus, heat insulating property of heat insulating sheet 10 hardly degrades.

Heat insulators 13 to 16 are sealed with regions 1E to 1H where sheets 11 and 12 are joined together, respectively, in addition to regions 1A to 1D.

The extensible rates of fiber sheets 17A to 17D are larger than those of sheets 11 and 12, but the extensible rates of heat insulators 13 to 16 including fiber sheets 17A to 17D holding xerogels 117A to 117B are smaller than those of fiber sheets 17A to 17D. Thus, the extensible rates of sheet 11 and sheet 12 are larger than those of heat insulators 13 to 16.

The extensible rates of sheets 11 and 12 are twice or more the extensible rates of heat insulators 13 to 16. In this configuration, even upon having a strong force applied to heat insulating sheet 10, a force applied to heat insulators 13 to 16 can be reduced. The thicknesses of sheets 11 and 12 in direction D1 are smaller than those of heat insulators 13 to 16 in direction D1. In this configuration, even upon having a strong force applied to heat insulating sheet 10, a force applied to heat insulators 13 to 16 can be further reduced.

Parts of fibers in fiber sheets 17A to 17D are exposed at the surfaces of heat insulators 13 to 16. The exposed parts of the fibers are thermally welded to sheets 11 and 12. This configuration allows heat insulators 13 to 16 to be firmly joined to sheets 11 and 12.

Figure 3:
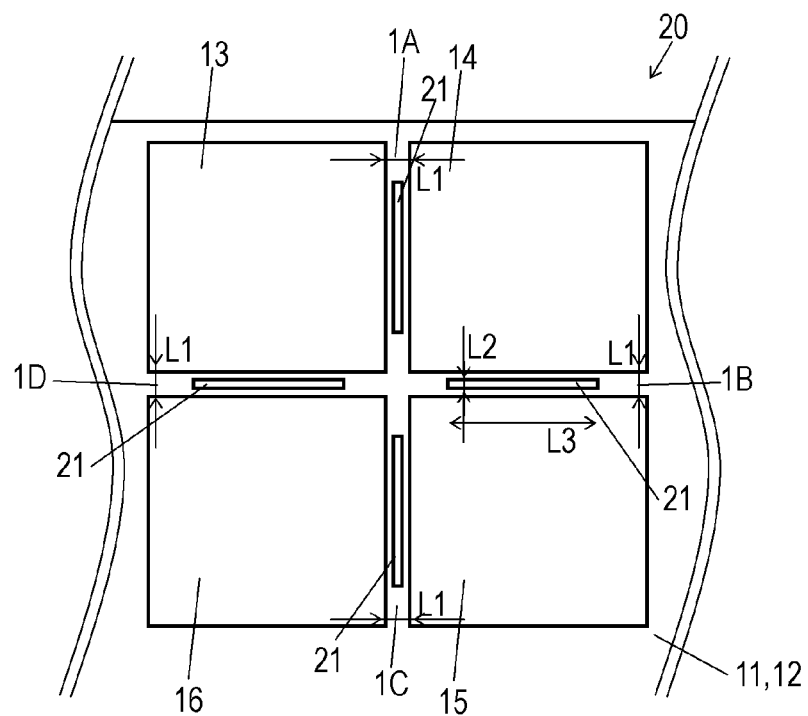
FIG. 3 is a top view of another heat insulating sheet according to Embodiment 1.

FIG. 3 is a top view of another heat insulating sheet 20 according to Embodiment 1. In FIG. 3, components identical to those of heat insulating sheet 10 illustrated in FIGS. 1 and 2 are denoted by the same reference numerals.

Heat insulating sheet 20 has slits 21 passing through sheets 11 and 12 provided in regions 1A to 1D. In accordance with Embodiment 1, each slit 21 has width L2 of 0.4 mm and a length L3 of 40 mm. Slits 21 increase the extensible rates of sheets 11 and 12 in regions 1A to 1D. This configuration reduces a force applied to heat insulators 13 to 16 even upon having a force applied to heat insulating sheet 20. Slits 21 may be notches formed by partially cutting regions 1A to 1D. The extensible rates of the sheets with slits 21 in regions 1A to 1D refer to the extensible rates of regions 1A to 1D upon extending opposite sides across width L2 of slits 21.

Figure 4:
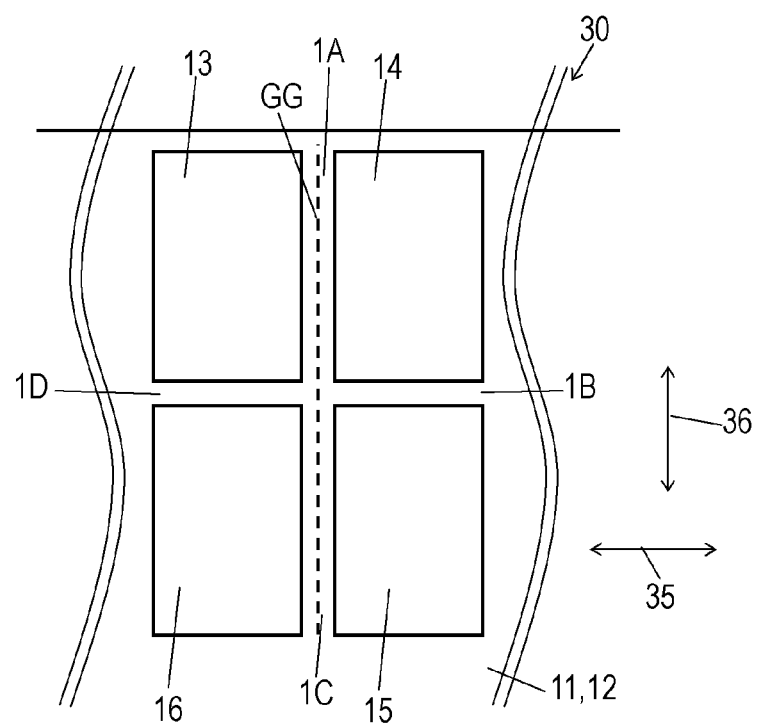
FIG. 4 is a top view of still another heat insulating sheet according to Embodiment 1.

FIG. 4 is a top view of still another heat insulating sheet 30 according to Embodiment 1. In FIG. 4, components identical to those of heat insulating sheet 10 illustrated in FIGS. 1 and 2 are denoted by the same reference numerals.

In heat insulating sheet 30, each of heat insulators 13 to 16 has a rectangular shape having short sides and long sides viewing in direction D1. In accordance with Embodiment 1, the lengths of the long sides of the rectangular shape are 80 mm while the lengths of the short sides thereof are 30 mm. The short sides extend in short-side direction 35. The long sides extend in long-side direction 36 and are longer than the short sides. In a configuration in which width L1 of each of regions 1A to 1D is equal to or more than 1% of the length of the short sides, upon having a force applied to heat insulating sheet 30, regions 1A to 1D sufficiently extend so as to reduce a force applied to heat insulators 13 to 16. In a configuration in which width L1 of each of regions 1A to 1D is equal to or smaller than 10% of the length of the short sides, the sum of the areas of heat insulators 13 to 16 in heat insulating sheet 30 is sufficiently large so as to allow insulating sheet 30 to have heat insulating property. Since heat insulators 13 to 16 have rectangular shapes, extensibility of heat insulating sheet 30 in short-side direction 35 is larger than that in long-side direction 36. That is, heat insulating sheet 30 has anisotropy in extensibility.

In regions 1A and 1C, sheets 11 and 12 are joined together by sewing with sutures GG. Sheets 11 and 12 sewed together provide heat insulating sheet 30 with large mechanical strength. Sheets 11 and 12 are sewed together in a single direction. This configuration allows heat insulating sheet 30 to be less extendible in this direction than in the other directions. That is, heat insulating sheet 30 has anisotropy in extensibility. The shape of each of heat insulators 13 to 16 viewing in direction D1 is not limited to a specific shape. Sheets 11 and 12 may be joined together with an adhesive layer provided between the sheets.

Figure 5:
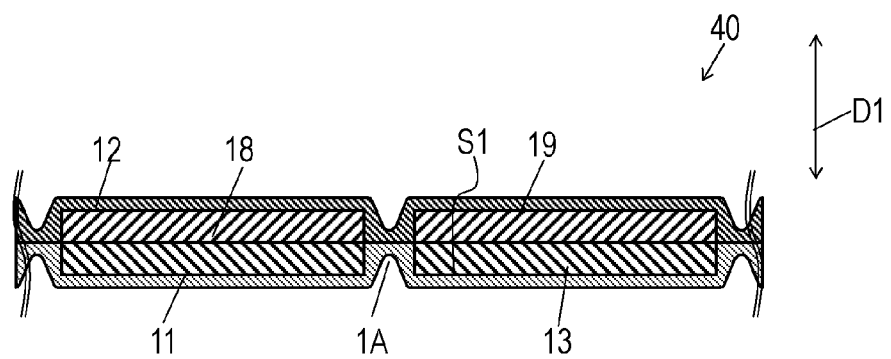
FIG. 5 is a top view of a further heat insulating sheet according to Embodiment 1.

FIG. 5 is a cross-sectional view %of further heat insulating sheet 40 according to Embodiment 1. In FIG. 5, components identical to those of heat insulating sheet 10 illustrated in FIGS. 1 and 2 are denoted by the same reference numerals.

Heat insulating sheet 40 further includes heat insulators 18 and 19 disposed on the upper surface of heat insulator 13 and the upper surface of heat insulator 14 illustrated in FIG. 2, respectively. The shapes and compositions of materials of heat insulators 18 and 19 are identical to those of heat insulators 13 and 14. This configuration, heat insulating sheet 40 has high heat insulating property, and has heat insulating property thereof hardly degrading even upon having a force applied to the heat insulators. Heat insulators 18 and 19 may deviate from positions directly above heat insulators 13 and 14 in a direction parallel to main surface S1. This configuration allows entire heat insulating sheet 40 to have high heat insulating property. Similarly to heat insulators 13 and 14, a heat insulator may be provided on the upper surface of each of heat insulators 15 and 16. This configuration provides heat insulating sheet 40 with high heat insulating property, and allows the heat insulating property to hardly degrade even upon having a force applied to the heat insulator.

Exemplary Embodiment 2

Figure 6:
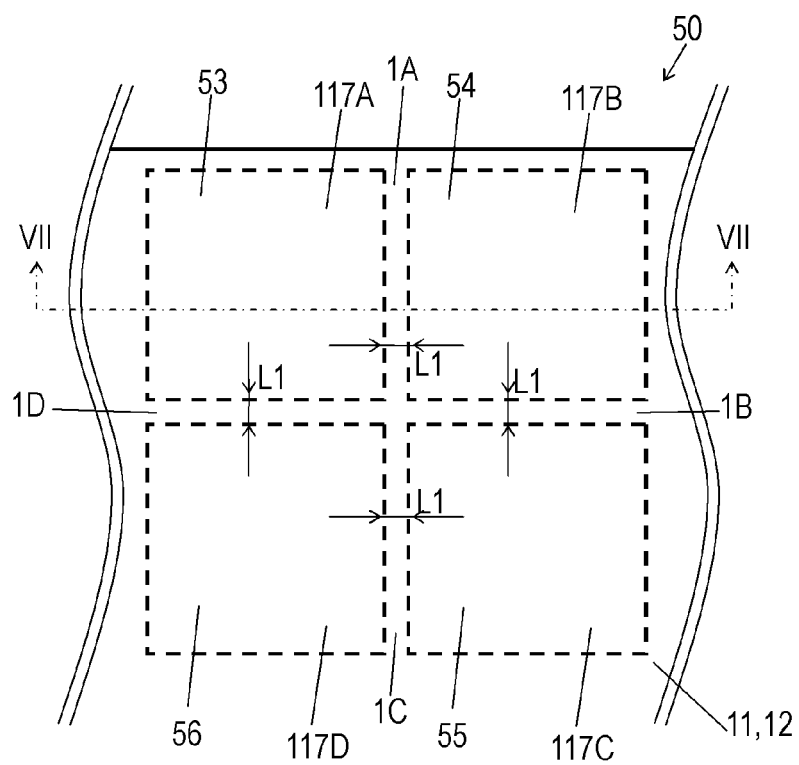
FIG. 6 is a top view of a heat insulating sheet according to Exemplary Embodiment 2.
Figure 7:
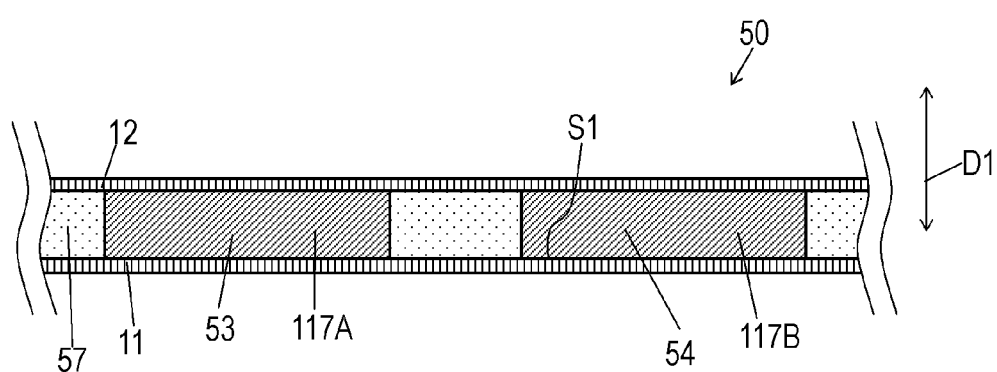
FIG. 7 is a cross-sectional view of the heat insulating sheet along line VII-VII shown in FIG. 6.

FIG. 6 is a top view of heat insulating sheet 50 according to Exemplary Embodiment 2. FIG. 7 is a cross-sectional view of heat insulating sheet 50 along line VII-VII illustrated in FIG. 6. In FIGS. 6 and 7, components identical to those of heat insulating sheet 10 according to Embodiment 1 illustrated in FIGS. 1 and 2 are denoted by the same reference numerals. Heat insulating sheet 50 includes single fiber sheet 57 holding xerogels 117A to 117D, instead of fiber sheets 17A to 17D holding xerogels 117A to 117D of heat insulators 13 to 16 of heat insulating sheet 10 according to Embodiment 1, respectively.

Heat insulating sheet 50 includes sheet 11, heat insulator 53 disposed on main surface S1 of sheet 11 and including xerogel 117A, heat insulator 54 disposed on main surface S1 apart from heat insulator 53, heat insulator 55 disposed on main surface S1 part from heat insulators 53 and 54, and heat insulator 56 disposed on main surface S1 apart from heat insulators 53, 54, and 55. Heat insulator 54 includes xerogel 117B. Heat insulator 55 includes xerogel 117C. Heat insulator 56 includes xerogel 117D.

The heat insulating sheet 50 also includes sheet 12 disposed on main surface S1 of sheet 11 to cover heat insulators 53, 54, 55, and 56.

In heat insulating sheet 50, no xerogel is held in any of region 1A between heat insulators 53 and 54, region 1B between heat insulators 54 and 55, region 1C between heat insulators 55 and 56, and region 1D between heat insulators 53 and 56. Sheets 11 and 12 are joined together with fiber sheet 57 between the sheets at heat insulators 53 to 56 and regions 1A to 1D. That is, fiber sheet 57 is joined to sheets 11 and 12 at heat insulators 53 to 56 and regions 1A to 1D.

In accordance with Embodiment 2, each of regions 1A to 1D has width L1 of 2 mm. Heat insulators 53 to 56 can be obtained by locally impregnating fiber sheet 57 with xerogels 117A to 117D, respectively.

Each of heat insulators 53 to 56 has a square shape with sides having lengths of about 50 mm, viewing in direction D1.

Fiber sheet 57 has a thickness of 0.3 mm and is made of nonwoven fabric of thermoplastic resin, such as polyethylene terephthalate (PET).

In accordance with Embodiment 1, sheets 11 and 12 have thicknesses of 0.05 mm in direction D1.

Since fiber sheet 57 and sheets 11 and 12 have thermoplastic properties, fiber sheet 57 and sheets 11 and 12 can be joined together by thermal sealing upon being heated.

In regions 1A to 1D, fiber sheet 57 may be joined to sheets 11 and 12 by sewing with sutures. Fiber sheet 57 sewed together with sheets 11 and 12 provides heat insulating sheet 50 with large mechanical strength. The configuration in which sheets 11 and 12 are sewed together in a single direction allows heat insulating sheet 50 to be less extensible in this direction than in the other directions. That is, heat insulating sheet 50 has anisotropy in extensibility. The shape of each of heat insulators 53 to 56 viewing in direction D1 is not limited to a square.

Sheet 11 and sheet 12 and fiber sheet 57 may be joined together with an adhesive layer between the fiber sheets and each of the sheets.

The extensible rates of regions 1A to 1D of heat insulating sheet 50 are larger than those of heat insulators 53 to 56. This is because no xerogel is included in fiber sheet 57 in regions 1A to 1D, whereas xerogels 117A to 117D are included in heat insulators 53 to 56. Even upon having a force applied to heat insulating sheet 50, the above configuration causes sheets 11 and 12 and fiber sheet 57 in regions 1A to 1D to be more extensible than in other regions, thereby reducing a force applied to heat insulators 53 to 56. Thus, heat insulating property of heat insulating sheet 50 hardly degrades. The extensible rates of regions 1A to 1D of heat insulating sheet 50 in accordance with Embodiment 2 are measured by pulling fiber sheet 57 and sheets 11 and 12 that are joined together in regions 1A to 1D.

Figure 8:
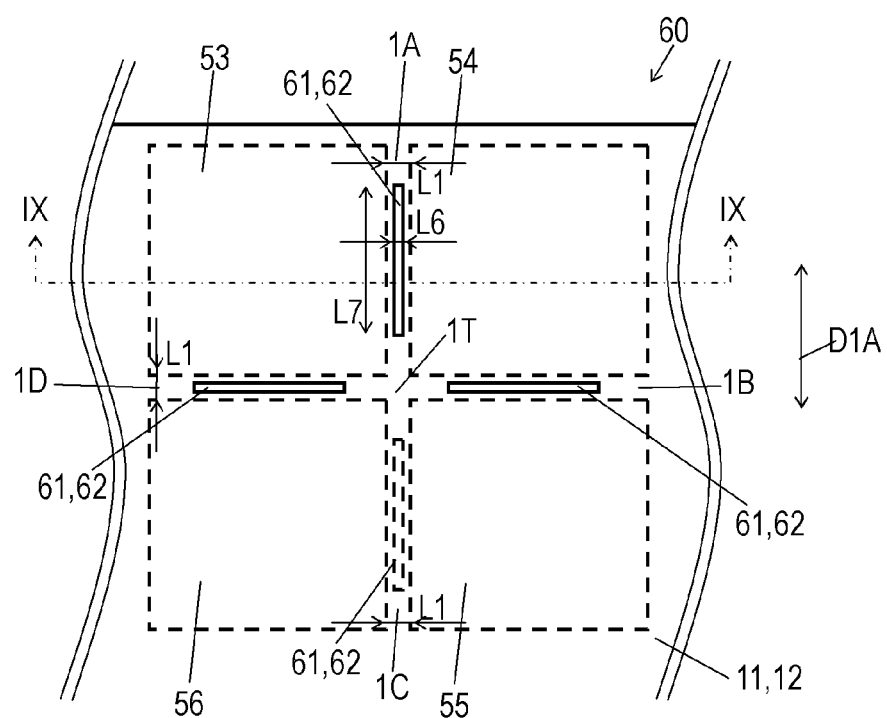
FIG. 8 is a top view of a modification of the heat insulating sheet having a slit according to Embodiment 2.
Figure 9:
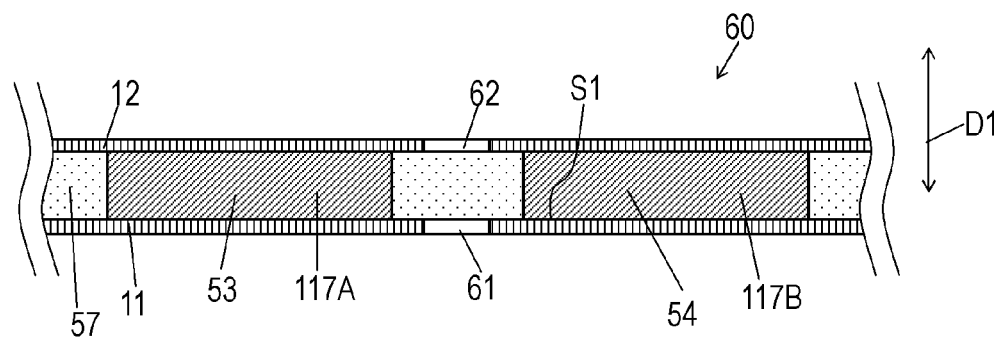
FIG. 9 is a cross-sectional view of the heat insulating sheet along line IX-IX illustrated in FIG. 8.

FIG. 8 is a top view of another heat insulating sheet 60 according to Embodiment 2. FIG. 9 is a cross-sectional view of heat insulating sheet 60 along line IX-IX illustrated in FIG. 8. In FIGS. 8 and 9, components identical to those of heat insulating sheet 50 illustrated in FIGS. 6 and 7 are denoted by the same reference numerals.

In heat insulating sheet 60, slits 61 and 62 passing through sheets 11 and 12, respectively, are provided in regions 1A to 1D. Slits 61 and 62 extend slenderly in direction D1A along opposed sides of heat insulators 53 and 54. In accordance with Embodiment 2, each of slits 61 and 62 has length L7 of 40 mm in direction D1A, and width L6 of 0.4 mm in a direction perpendicular to direction D1A. Slits 61 and 62 cause portions of fiber sheet 57 exposed from slits 61 and 62 in regions 1A to 1D to have the highest extensible rate in heat insulating sheet 60. Thus, even upon having a force applied to heat insulating sheet 60, a force applied to heat insulators 53 to 56 can be reduced. Slits 61 and 62 may be notches formed by partially cutting sheets 11 and 12 in regions 1A to 1D. Similarly to slits 61 and 62 in region 1A, slits passing through sheets 11 and 12 are provided in regions 1B to 1D. The slits provided in regions 1A to 1D have different lengths.

The extensible rates of regions 1A to 1D where slits 61 and 62 are provided refer to the extensible rates of regions 1A to 1D upon extending at opposite sides across width L6 of slits (61, 62).

Width L6 of slits 61 and 62 is preferably twice or more the thickness of sheets 11 and 12. This configuration increases extension of regions 1A to 1D. Width L6 of slits 61 and 62 is preferably equal to or smaller than ⅓ the width L1 of regions 1A to 1D. This configuration increases the area of fiber sheet 57 bonded to sheets 11 and 12 in regions 1A to 1D. As a result, even upon having a force applied to heat insulating sheet 60, a force applied to heat insulators 53 to 56 is reduced so that heat insulating property of heat insulating sheet 60 can hardly degrade.

The extensible rates of sheets 11 and 12 are preferably smaller than the extensible rate of fiber sheet 57. Even upon having a force applied to heat insulating sheet 60, the above configuration reduces a force applied to heat insulators 53 to 56 so that heat insulating property of heat insulating sheet 60 can hardly degrade.

A hole, such as a slit, passing through sheets 11 and 12 is preferably not provided between regions 1A and 1C, that is, in region 1T between regions 1B and 1D. Even upon having a force applied to heat insulating sheet 60, the above configuration reduces a force applied to heat insulators 53 to 56 so that heat insulating property of heat insulating sheet 60 can hardly degrade.

Similarly to heat insulators 13 to 16 of heat insulating sheet 30 illustrated in FIG. 4, each of heat insulators 53 to 56 may have a rectangular shape having short sides and long sides. The shapes of slits (61, 62) formed in regions 1A to 1D may have different shapes in order to provide heat insulating sheet 60 with anisotropy in extensibility in directions parallel to main surface S1.

A method for manufacturing heat insulating sheet 50 according to Embodiment 2 will be described below.

First, fiber sheet 57 having a thickness of about 0.3 mm and made of nonwoven fabric of PET is impregnated with xerogels 117A to 117B, thereby forming heat insulators 53 to 56, respectively.

Heat insulators 53 to 56 can be formed as follows. For example, sol solution is produced by adding hydrochloric acid to sodium silicate aqueous solution. Portions of fiber sheet 57 where heat insulators 53 to 56 are to be formed are screen printed with the sol solution, thereby impregnating fiber sheet 57 with the sol solution. After that, the impregnated sol solution is changed to gel. The gel changed from the sol solution is hydrophobized to be dried, thereby obtaining heat insulators 53 to 56.

Heat insulators 53 to 56 can be formed as follows. A mask having openings corresponding only to portions of fiber sheet 57 where heat insulators 53 to 56 are to be formed is placed on fiber sheet 57. Fiber sheet 57 is irradiated with plasma to openings of the mask so that only the portions of fiber sheet 57 where heat insulators 53 to 56 are to be formed are hydrophilized. After that, fiber sheet 57 is immersed in the sol solution so that the hydrophilized portions of fiber sheet 57 are impregnated with the sol solution, thereby forming heat insulators 53 to 56. Alternatively, the portions of fiber sheet 57 may be irradiated with plasma and hydrophilized, and then, the hydrophilized portions of fiber sheet 57 may be impregnated with the sol solution by screen printing.

Subsequently, sheets 11 and 12 having thicknesses of about 0.05 mm and made of PET are placed on each surface of fiber sheet 57 where heat insulators 53 to 56 are formed. A heated trowel is put on regions 1A to 1E so as to weld fiber sheet 57 to sheets 11 and 12 with heat in regions 1A to 1E, thereby providing heat insulating sheet 50.

In the case that heat insulating sheet 60 is obtained by forming slits 61 and 62 in heat insulating sheet 50, slits 61 and 62 are previously formed in sheets 11 and 12 preferably in terms of fabrication.

Exemplary Embodiment 3

Figure 10A:
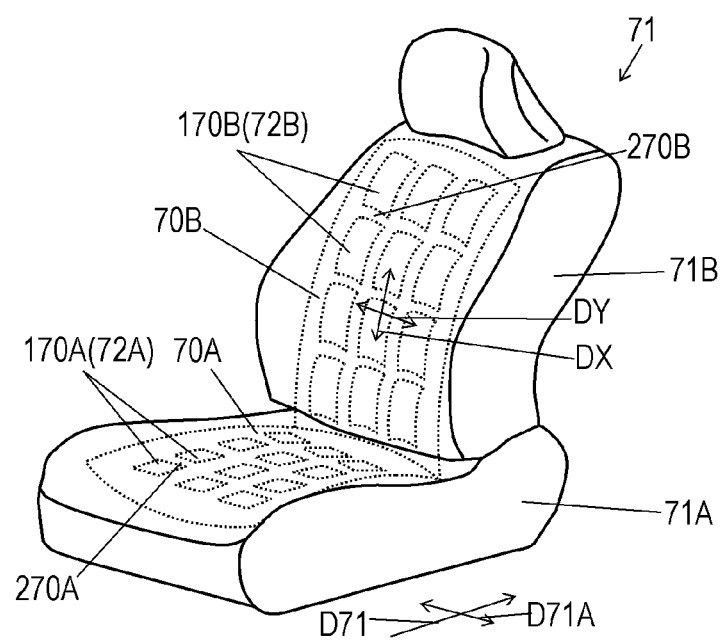
FIG. 10A is a perspective view of a backrest seat according to Exemplary Embodiment 3.

FIG. 10A is a perspective view of backrest seat 71 according to Exemplary Embodiment 3. Backrest seat 71 includes seat part 71A, backrest part 71B which is coupled to seat part 71A in direction D71 and is configured to have a user leans on the backrest, heat insulating sheet 70A disposed on seat part 71A, and heat insulating sheet 70B disposed on backrest part 71B. The user is seated on seat part 71A and leans on backrest part 71B at the back thereof. In accordance with Embodiment 3, heat insulating sheet 70A is connected continuously to heat insulating sheet 70B. Alternatively, heat insulating sheet 70A may be separated from heat insulating sheet 70B. That is, heat insulating sheets 70A and 70B extend from seat part 71A to backrest part 71B of backrest seat 71. The surface layer of backrest seat 71 is made of, e.g. cloth or leather.

Heat insulating sheets 70A and 70B have configurations similar to that of heat insulating sheet 10 according to Embodiment 1. Heat insulating sheet 70A includes twelve heat insulators 170A similar to heat insulators 13 to 16 of heat insulating sheet 10 according to Embodiment 1. Heat insulating sheet 70B includes twelve heat insulators 170B similar to heat insulators 13 to 16 of heat insulating sheet 10 according to Embodiment 1. Similarly to regions 1A to 1D of heat insulating sheet 10 according to Embodiment 1, heat insulating sheet 70A includes region 270A provided between adjacent ones of heat insulators 170A. Similarly to regions 1A to 1D of heat insulating sheet 10 according to Embodiment 1, heat insulating sheet 70B includes region 270B provided between adjacent ones of heat insulators 170B. Heat insulators 170A include fiber sheets 72A similar to fiber sheets 17A to 17D of heat insulators 13 to 16 of heat insulating sheet 10 according to Embodiment 1. Heat insulators 170B include fiber sheets 72B similar to fiber sheets 17A to 17D of heat insulators 13 to 16 of heat insulating sheet 10 according to Embodiment 1.

Sheet 11 is joined to sheet 12 in regions 270A and 270B of heat insulating sheets 70A and 70B. The extensible rates of heat insulating sheets 70A and 70B in regions 270A and 270B are larger than those of heat insulators 170A and 170B.

Even upon having a force applied to heat insulating sheets 70A and 70B on seat part 71A and backrest part 71B due to the sitting of the user, sheets 11 and 12 in the regions 270A and 270B are more extensible than in other regions so that a force applied to heat insulators 170A and 170B is reduced. Thus, heat insulating property of heat insulating sheets 70A and 70B hardly degrade.

The extensible rates of sheets 11 and 12 higher than the extensible rates of fiber sheets 72A and 72B allow regions 270A and 270B to be more extensible than in other regions even upon having a force applied to heat insulating sheets 70A and 70B in seat part 71A and backrest part 71B caused by the sitting of the user, so that a force applied to heat insulators 170A and 170B can be reduced.

Backrest seat 71 may further include a cover that covers seat part 71A and a heater disposed between seat part 71A and the cover. Heat generated by the heater transmits only to the user sitting on the seat, hence providing advantages, such as quick warming and reduction of energy consumption.

In heat insulating sheet 70B, the extensible rate of region 270B of heat insulating sheet 70B between heat insulators 170B viewing in direction D1 perpendicular to main surface S1 of sheet 11 is larger than the extensible rate of heat insulator 170B. In heat insulating sheet 70B, the extensible rate of heat insulating sheet 70B in direction DX parallel to main surface S1 of sheet 11 is larger than the extensible rate of heat insulating sheet 70B in direction DY parallel to main surface S1 of sheet 11 and different from direction DX.

Figure 10B:
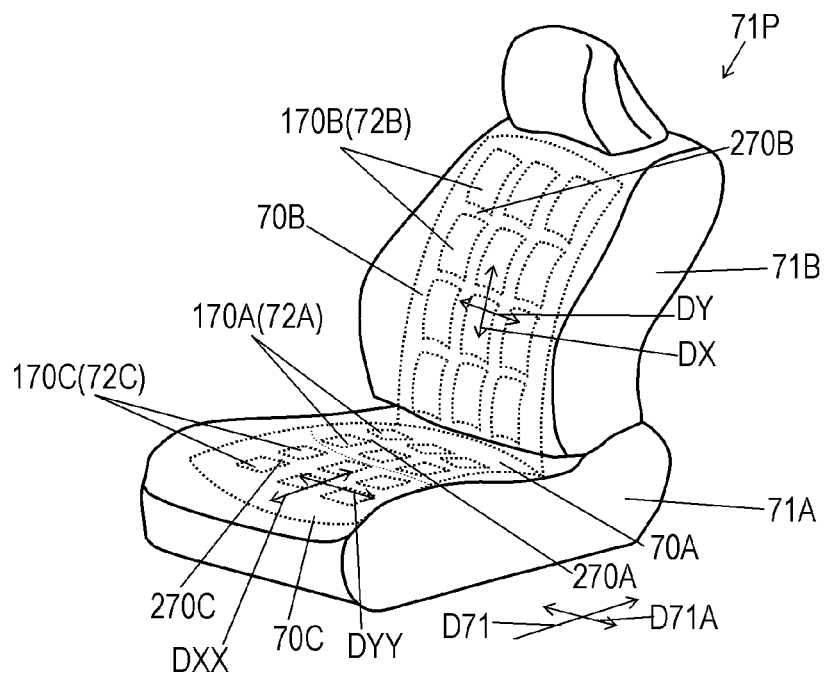
FIG. 10B is a perspective view of another backrest seat according to Embodiment 3.

FIG. 10B is a perspective view of another backrest seat 71P according to Embodiment 3. In FIG. 10B, components identical to those of backrest seat 71 illustrated in FIG. 10A are denoted by the same reference numerals. Backrest seat 71P further includes heat insulating sheet 70C disposed on seat part 71A and located farther from backrest part 71B than heat insulating sheet 70A. Heat insulating sheet 70C is connected continuously to heat insulating sheet 70A. Heat insulating sheet 70C has a configuration similar to that of heat insulating sheet 10 according to Embodiment 1. Similarly to heat insulators 170A and 170B of heat insulating sheets 70A and 70B, heat insulating sheet 70C includes heat insulators 170C separated from each other across region 270C between heat insulators 170C. In heat insulating sheet 70C far away from backrest part 71B extends in width direction D71A perpendicular to direction D71 more than in direction D71. Heat insulating sheet 70A near backrest part 71B is extensible more in direction D71 than in width direction D71A. Thus, seat part 71A can easily fit the body of the user so as to provide the user with comfortable sitting. In addition, the configuration in which backrest part 71B extensible in width direction D71A more than in direction D71 allows backrest part 71B to be easily fit the body of the user sitting on the seat, thus providing the user with comfortable sitting. To obtain extensibility in a single direction, similarly to heat insulators 13 to 16 of heat insulating sheet 30 illustrated in FIG. 4, heat insulators 170A to 170C have rectangular shapes viewing in direction D1 (see FIG. 2). In this case, the sheet is extensible more in the short-side direction than in the long-side direction. Alternatively, sheets 11 and 12 may be sewed together only in the single direction in regions 270A to 270C so that the sheet may be more extensible in a direction perpendicular to the sewing direction.

In heat insulating sheet 70C, the extensible rate of region 270C between heat insulators 170C in direction D1 perpendicular to main surface S1 of sheet 11 is larger than the extensible rate of heat insulators 170C. In heat insulating sheet 70C, the extensible rate of heat insulating sheet 70C in direction DXX parallel to main surface S1 of sheet 11 is larger than the extensible rate of heat insulating sheet 70C in direction DYY parallel to main surface S1 of sheet 11 and perpendicular to direction DXX. Direction D1 is perpendicular to direction DXX. Direction DY is perpendicular to direction DX. Direction DY of heat insulating sheet 70B is identical to direction DYY of heat insulating sheet 70C.

In accordance with the above embodiments, heat insulating sheets 70A and 70B (70C) extend from seat part 71A to backrest part 71B. Alternatively, heat insulating sheets 70A and 70B (70C) may be disposed only on seat part 71A or individually disposed on seat part 71A and backrest part 71B.

Figure 11:
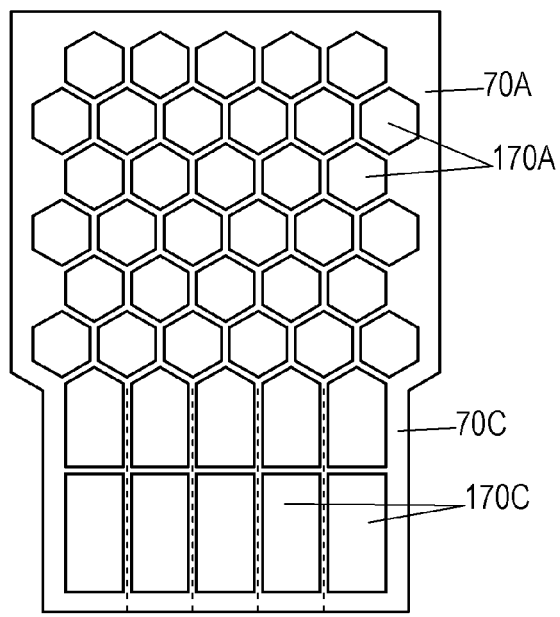
FIG. 11 is a top view of a heat insulating sheet used for the backrest seat according to Embodiment 3.

FIG. 11 is a top view of other heat insulating sheets 70A and 70B according to Embodiment 3. In FIG. 11, components identical to those of heat insulating sheets 70A and 70B illustrated in FIG. 10 are denoted by the same reference numerals. Each heat insulator 170A of heat insulating sheet 70A illustrated in FIG. 11 has a hexagonal shape. In this case, the extensible rate of heat insulating sheet 70A can have isotropy. Specifically, heat insulators 170A of heat insulating sheet 70A close to backrest part 71B of seat part 71A have hexagonal shapes. Heat insulators 170C of heat insulating sheet 70C further away from backrest part 71B have rectangular shapes. When the user sits on the seat, heat insulators 170A contacting the hip of the user have hexagonal shapes and the heat insulators 170C contacting the thighs have rectangular shapes. This configuration allows heat insulating sheet 70A contacting the hips to extend isotropically, and allows heat insulating sheet 70C contacting the thighs to easily extend in width direction D71A, hence enhancing comfortable sitting.

Heat insulating sheets 70A to 70C may have configurations similar to those of heat insulating sheets 20 to 60 in accordance with Embodiments 1 and 2.

Figure 12:
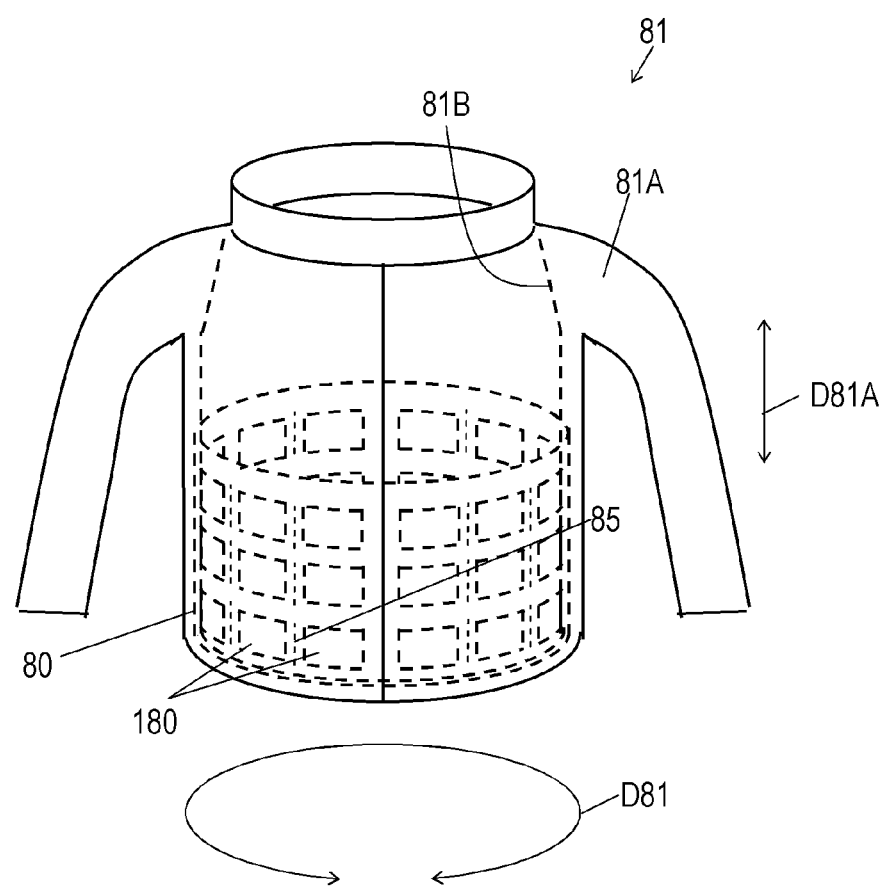
FIG. 12 is a perspective view of a cold weather garment according to Embodiment 3.

FIG. 12 is a perspective view of cold weather garment 81 according to Embodiment 3. Cold weather garment 81 includes outer fabric 81A, lining 81B coupled to outer fabric 81A, and heat insulating sheet 80 disposed on outer fabric 81A and between outer fabric 81A and lining 81B. Heat insulating sheet 80 is heat insulating sheet 10 according to Embodiment 1. Heat insulating sheet 80 has a thickness of about 1 mm. Heat insulating sheet 80 is disposed around the entire waist of cold weather garment 81. Similarly to heat insulators 13 to 16 of heat insulating sheet 10 according to Embodiment 1, heat insulating sheet 80 includes heat insulators 180 arranged with intervals of about 3 mm between the heat insulators. Each heat insulator 180 has a width of about 50 mm and a length of about 100 mm. Heat insulators 180 are sealed with sheets 11 and 12. Slit 85 extending in length direction D81A perpendicular to waist direction D81 of cold weather garment 81 is disposed between adjacent ones of heat insulators 180. Cold weather garment 81 is thus extensible more in waist direction D81 than in length direction D81A so that comfort in wearing can be obtained. When heat insulating sheet 80 is disposed in the entire waist direction, the inside of the garment may tend to be so stuffy that uncomfortable feeling might occur. Slits 85 prevents the inside of the cold weather garment from being stuffy.

REFERENCE MARKS IN DRAWINGS 10 heat insulating sheet
11 sheet
12 sheet
13 heat insulator
14 heat insulator
15 heat insulator
16 heat insulator
17A fiber sheet
17B fiber sheet
17C fiber sheet
17D fiber sheet
18 heat insulator
19 heat insulator
20 heat insulating sheet
21 slit
30 heat insulating sheet
40 heat insulating sheet
50 heat insulating sheet 53 heat insulator
54 heat insulator
55 heat insulator
56 heat insulator
57 fiber sheet
60 heat insulating sheet
61 slit
71 backrest seat
71A seat part
71B backrest part
71P backrest seat
117A xerogel
117B xerogel
117C xerogel
117D xerogel

The invention claimed is:

1. A heat insulating sheet comprising:
a first sheet having a main surface;
a first heat insulator disposed on the main surface of the first sheet, the first heat insulator including a first xerogel;
a second heat insulator disposed on the main surface of the first sheet apart from the first heat insulator, the second heat insulator including a second xerogel;
a second sheet disposed on the main surface of the first sheet to cover the first heat insulator and the second heat insulator;
a third heat insulator disposed on the main surface of the first sheet apart from the first heat insulator and the second heat insulator, the third heat insulator including a third xerogel; and
a fourth heat insulator disposed on the main surface of the first sheet apart from the first heat insulator, the second heat insulator, and the third heat insulator, the fourth heat insulator including a fourth xerogel,
wherein the second sheet is disposed on the main surface of the first sheet to cover the first heat insulator, the second heat insulator, the third heat insulator, and the fourth heat insulator,
wherein the first heat insulator has a rectangular shape when viewed in a direction perpendicular to the main surface of the first sheet,
wherein the second heat insulator has a rectangular shape when viewed in the direction perpendicular to the main surface of the first sheet,
wherein the third heat insulator has a rectangular shape when viewed in the direction perpendicular to the main surface of the first sheet,
wherein the fourth heat insulator has a rectangular shape when viewed in the direction perpendicular to the main surface of the first sheet,
wherein a first region of the heat insulating sheet provided between one side of the rectangular shape of the first heat insulator and one side of the rectangular shape of the second heat insulator viewing in the direction perpendicular to the main surface has an extensible rate larger than an extensible rate of each of the first heat insulator and the second heat insulator,
wherein a second region of the heat insulating sheet provided between one side of the rectangular shape of the third heat insulator and one side of the rectangular shape of the fourth heat insulator viewing in the direction perpendicular to the main surface has an extensible rate larger than an extensible rate of each of the third heat insulator and the fourth heat insulator,
wherein a third region of the heat insulating sheet provided between another side of the rectangular shape of the first heat insulator and another side of the rectangular shape of the third heat insulator viewing in the direction perpendicular to the main surface has an extensible rate larger than an extensible rate of each of the first heat insulator and the third heat insulator,
wherein a fourth region of the heat insulating sheet provided between another side of the rectangular shape of the second heat insulator and another side of the rectangular shape of the fourth heat insulator viewing in the direction perpendicular to the main surface has an extensible rate larger than an extensible rate of each of the second heat insulator and the fourth heat insulator,
wherein the first sheet is joined to the second sheet in the first region, the second region, the third region, and the fourth region,
wherein a first slit, a second slit, a third slit, and a fourth slit which pass through the first sheet and the second sheet are provided in the first region, the second region, the third region, and the fourth region, respectively, an entirety of the first slit, an entirety of the second slit, an entirety of the third slit, and an entirety of the fourth slit being disposed within the first region, the second region, the third region, and the fourth region, respectively, and
wherein no hole passing through the first sheet and the second sheet is provided in a region which is located between the first region and the second region and between the third region and the fourth region.

2. The heat insulating sheet of claim 1,
wherein the first heat insulator further includes a first fiber sheet made of first fibers holding the first xerogel, and
wherein the second heat insulator further includes a second fiber sheet made of second fibers holding the second xerogel.

3. The heat insulating sheet of claim 2, wherein both of the first fiber sheet and the second fiber sheet are joined to both of the first sheet and the second sheet.

4. The heat insulating sheet of claim 2, wherein the first heat insulator further includes:
a third fiber sheet made of third fibers placed on the first fiber sheet; and a third xerogel held by the third fibers, and
wherein the second heat insulator further includes:
a fourth fiber sheet made of fourth fibers placed on the second fiber sheet; and
a fourth xerogel held by the fourth fibers.

5. The heat insulating sheet of claim 2,
wherein the first fibers are made of thermoplastic resin,
wherein the second fibers are made of thermoplastic resin,
wherein the first sheet is made of thermoplastic resin, and
wherein the second sheet is made of thermoplastic resin.

6. The heat insulating sheet of claim 2, wherein an extensible rate of each of the first sheet and the second sheet is larger than or equal to twice an extensible rate of the first heat insulator and the second heat insulator.

7. The heat insulating sheet of claim 1, wherein the first sheet and the second sheet are sewed together in the first region.

8. The heat insulating sheet of claim 7, wherein the first sheet and the second sheet are sewed together in a single direction in the first region.

9. The heat insulating sheet of claim 1,
wherein each of the first heat insulator and the second heat insulator has a rectangular shape viewing in a direction perpendicular to the main surface, and wherein a distance between the first heat insulator and the second heat insulator is larger than or equal to 1% and less than or equal to 10% of a short side of the rectangular shape.

10. The heat insulating sheet of claim 1, wherein a thickness of the first sheet and a thickness of the second sheet are smaller than thicknesses of the first heat insulator and the second heat insulator.

11. The heat insulating sheet of claim 1, wherein the first sheet and the second sheet are sewed together in at least one of the first region, the second region, the third region, or the fourth region.

12. The heat insulating sheet of claim 11, wherein the first sheet and the second sheet are sewed together in a plurality of regions of the first region, the second region, the third region, and the fourth region.

13. The heat insulating sheet of claim 12, wherein an extensible rate of the heat insulating sheet in a first direction parallel to the main surface is larger than an extensible rate of the heat insulating sheet in a second direction parallel to the main surface and different from the first direction.

14. The heat insulating sheet of claim 13, wherein the first slit, the second slit, the third slit, and the fourth slit have different lengths.

15. A backrest seat comprising:
a seat part;
a backrest part coupled to the seat part;
a first heat insulating sheet disposed on the seat part; and
a second heat insulating sheet disposed on the backrest part,
wherein the first heat insulating sheet comprises the heat insulating sheet of claim 1, and
wherein the second heat insulating sheet comprises the heat insulating sheet of claim 1.

16. The backrest seat of claim 15, further comprising
a third heat insulating sheet disposed on the seat part, the third heat insulating sheet being farther from the backrest part than the first heat insulating sheet,
wherein the third heat insulating sheet comprises the heat insulating sheet of claim 1.

17. A cold weather garment comprising:
an outer fabric; and
a heat insulating sheet disposed on the outer fabric,
wherein the first heat insulating sheet comprises the heat insulating sheet of claim 1.

18. The cold weather garment of claim 17, further comprising a lining coupled to the outer fabric,
wherein the heat insulating sheet is disposed between the outer fabric and the lining.

19. The heat insulating sheet of claim 1,
wherein the first slit extends straight and slenderly along the one side of the rectangular shape of the first heat insulator and the one side of the rectangular shape of the second heat insulator,
wherein the second slit extends straight and slenderly along the one side of the rectangular shape of the third heat insulator and one the side of the rectangular shape of the fourth heat insulator,
wherein the third slit extends straight and slenderly along the another side of the rectangular shape of the first heat insulator and the another side of the rectangular shape of the third heat insulator, and
wherein the first slit extends straight and slenderly along the another side of the rectangular shape of the second heat insulator and the another side of the rectangular shape of the fourth heat insulator.

* * * * *